(12) United States Patent  
Wecke et al.

(10) Patent No.: US 6,913,247 B2  
(45) Date of Patent: Jul. 5, 2005

(54) QUICK-ACTION TENSIONING DEVICE FOR CABLE CONTROL SWITCHES

(75) Inventors: Rolf Wecke, Bückeburg (DE); Meinhard Gerner, Minden (DE); Joachim Ulfik, Vlotho (DE); Markus Finger, Minden (DE)

(73) Assignee: Bernstein AG, Westfalica (DE)

( * ) Notice: Subject to any disclaimer, the term of this patent is extended or adjusted under 35 U.S.C. 154(b) by 72 days.

(21) Appl. No.: 10/602,628

(22) Filed: Jun. 25, 2003

(65) Prior Publication Data

US 2004/0088833 A1 May 13, 2004

(30) Foreign Application Priority Data

Jun. 26, 2002 (DE) .................................. 202 09 881 U

(51) Int. Cl.⁷ .............................................. B25B 25/00
(52) U.S. Cl. ...................................... 254/231; 254/234
(58) Field of Search ................................ 254/199, 230, 254/231, 232, 233, 234, 236, 262

(56) References Cited

U.S. PATENT DOCUMENTS

| | | | | |
|---|---|---|---|---|
| 765,523 A | * | 7/1904 | Turnbull ..................... 254/231 |
| 973,008 A | * | 10/1910 | Cyr ............................. 254/234 |
| 1,037,615 A | * | 9/1912 | Grenier ....................... 254/232 |
| 1,440,627 A | * | 1/1923 | Rasmussen et al. ......... 254/230 |
| 1,456,311 A | * | 5/1923 | Horsley ....................... 254/234 |
| 1,732,789 A | * | 10/1929 | Cornelius ................... 254/234 |
| 1,758,948 A | | 5/1930 | Helm |
| 1,923,812 A | | 1/1933 | Chobert |
| 2,772,070 A | * | 11/1956 | Stevenson ................... 254/199 |
| 2,822,199 A | * | 2/1958 | Johnson ....................... 403/45 |
| 2,935,300 A | * | 5/1960 | Elsner ........................ 254/199 |
| 3,751,083 A | | 8/1973 | Jacobson et al. |
| 3,960,359 A | * | 6/1976 | Svahn et al. ................ 254/231 |
| 3,980,275 A | * | 9/1976 | Sanchez ...................... 254/231 |
| 4,223,869 A | * | 9/1980 | Patterson et al. ......... 24/68 CD |
| 4,560,147 A | * | 12/1985 | Bowdren ..................... 254/231 |
| 4,612,686 A | * | 9/1986 | Bowers ....................... 24/71.1 |
| 4,830,339 A | * | 5/1989 | McGee et al. .............. 254/235 |
| 5,003,135 A | | 3/1991 | Piccoli |
| 5,159,729 A | * | 11/1992 | Walker ..................... 24/68 CD |
| 5,314,043 A | * | 5/1994 | Evezard et al. ............. 187/413 |
| 5,623,751 A | * | 4/1997 | Knutson ...................... 24/71.1 |
| 5,788,397 A | * | 8/1998 | Goto ........................... 403/268 |

FOREIGN PATENT DOCUMENTS

DE          715 789          1/1942

* cited by examiner

Primary Examiner—Emmanuel Marcelo  
(74) Attorney, Agent, or Firm—Barnes & Thornburg LLP

(57) ABSTRACT

A quick-action tensioning device (1) for cable control switches comprises a holding element (2), to which a cable (3) can be fastened in a clamping manner, and a housing (8), which is connected with the holding element (2). According to the invention, devices (9, 10) for a precise adjusting are provided between the housing (8) and the holding element (2). In particular, a nut (10) can be used for the precise adjusting, so that the cable tension can be continuously adjusted, in which case a rough adjustment as well as a precision adjustment can be carried out.

6 Claims, 1 Drawing Sheet

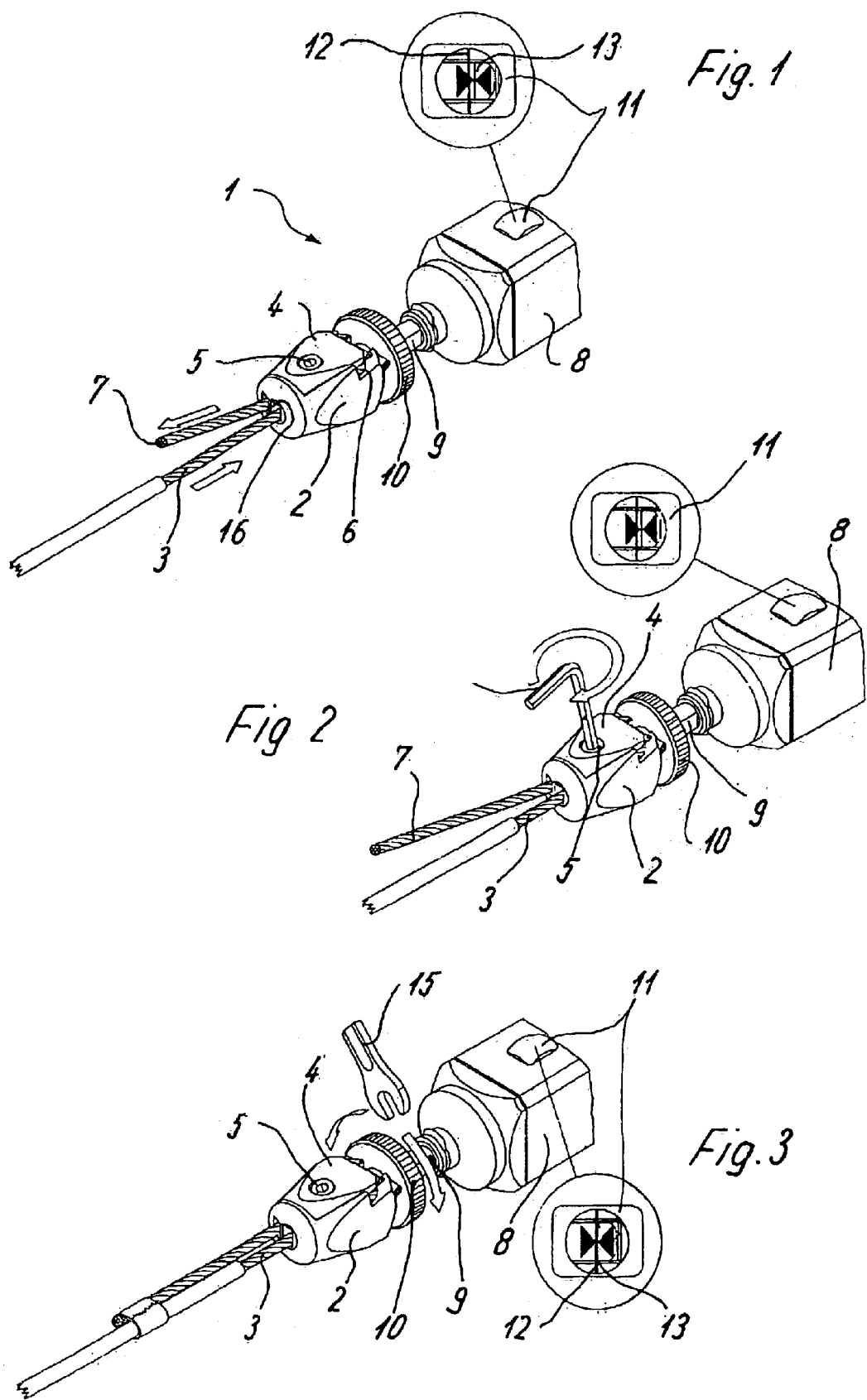

QUICK-ACTION TENSIONING DEVICE FOR CABLE CONTROL SWITCHES

CROSS-REFERENCE

This non-provisional application claims benefit of German Application No. 202 09 881.8 filed on Jun. 26, 2002, which disclosure is hereby incorporated by reference herein.

BACKGROUND AND SUMMARY OF THE INVENTION

The present invention relates to a quick-action tensioning device for cable control switches. The tensioning device has a holding element, to which a cable can be fastened in a clamping manner, and has a housings, which is connected with the holding element.

Quick-action tensioning devices for cable control switches exist in which the cable can be fastened between two clamping jaws, a movement of the cable in one direction being permitted as a result of the clamping jaws. Such a quick-action tensioning device is relatively comfortable to mount because the cable is pulled in the desired position and fixed. However, no precision adjustment is provided after an adjusting of the cable. Such quick-action tensioning devices are usually used in connection with cable control switches which are used in different environments, so that a lengthening or shortening of the cable can take place as a result of thermal influences. If such a change of the cable length cannot also be adjusted for by the quick-action tensioning device, the cable control switch may be triggered too early or too late, which would result in considerable danger.

The present invention relates to a quick-action tensioning device for cable control switches which permits a rough adjustment as well as a precision adjustment.

The present invention then is a quick-action tensioning device for cable control switches. The tensioning device includes a holding element to which a cable is fastened in a clamping manner. Also included is a housing connected with the holding element. A first device and a second device are provided between the housing and the holding element for precisely adjusting a distance between the housing and the holding element.

Since the quick-action tensioning device has precision adjusting devices between the housing and the holding element, the cable can first be clampingly fixed to the holding element, whereby a rough adjustment can be carried out. Should the cable length change as a result of thermal lengthening or shortening or because of expansion phenomena, a precision adjusting can be carried out. Therefore, the triggering of the cable control switch may always take place at a desirable point.

According to a preferred embodiment of the present invention, a threaded shaft is provided between the housing and the holding element. The distance between the housing and the holding element being adjustable by a nut. As a result, a continuous adjustment of the cable tension can be carried out. The nut is preferably constructed as a knurled nut, so that the precision adjusting can take place without any tool.

A device for detecting the cable tension is preferably provided in the housing. Since usually a certain force has to be overcome for the operation of a switch, the cable should initially have a certain tension in order to ensure a secure triggering. Accordingly, a display for the cable tension is provided at the housing, so that the precision adjusting can take place without any additional measuring of the cable tension, because the cable tension is shown by the display. Even small changes in the length of the cable can be detected.

For a secure fastening of the cable, the holding element has a plate so that the cable can be clamped between the plate and a body of the holding element. The cable is preferably deflected between the plate and the body, so that substantially high friction forces occur as a result of the clamping. The high friction forces can be absorbed by the quick-action tensioning device for cable control switches. The invention will be better understood and appreciated from the following detailed descriptions and with reference to the accompanying drawings.

BRIEF DESCRIPTION OF THE DRAWINGS

FIG. 1 is a perspective view of an embodiment of a quick-action tensioning device, according to the principles of the present invention.

FIG. 2 is a perspective view of the quick-action tensioning device of FIG. 1 illustrating a rough adjustment.

FIG. 3 is a perspective view of the quick-action tensioning device of FIG. 1 illustrating a precise adjustment.

DETAILED DESCRIPTION OF THE PREFERRED EMBODIMENTS

A quick-action tensioning device 1 includes a holding element 2 for fixing or clamping a cable 3. The holding element 2 includes a plate 4. The cable 3 can be clamped between the plate 4 and a body 17 of the holding element 2 by a screw 5. The cable 3 may be guided through a central opening 16 in the holding element 2. A deflection 6 is included in an area of the holding element 2 so that an end section 7 of the cable 3 emerges from a front side of the holding element 2.

The quick-action tensioning device 1 also includes a housing 8 which is connected by a threaded shaft 9 with the holding element 2. A nut 10, which may be a knurled nut, may be mounted on the threaded shaft 9. The knurled nut 10 may be used to change a distance between the holding element 2 and the housing 8.

The housing 8 may include a device for detecting a tension of the cable 3. The device, may be a spring element (not shown), by which a pretensioning at the threaded shaft 9 can be detected.

In addition, a display 11 for the cable tension is provided on the housing 8. A stationary marking 12 is arranged in a window at the display 11. Behind the marking 12 a dial 13 can be moved as a function of the cable tension. In a preferred embodiment, a desired cable tension may be indicated by a centering line 13A on the dial 13, so that deviations between the marking 12 and the centering line 13A are easily recognizable.

For fastening the cable 3 to the quick-action tensioning device 1, the cable 3 is first pulled through the holding element 2, as shown by the arrows in FIG. 2 and is fastened to the holding element 2. The plate 4 is pulled tight by an L-shaped hexagon key 14, and the cable 3 is brought roughly into a desired position.

As illustrated in FIG. 3, a precision adjusting can take place subsequently. The cable 3 fastened to the holding element 2 may be moved relative to the housing 8, by a rotation of the knurled nut 10. If greater forces have to be expended, a monkey wrench 15, or equivalent tool, may be applied to the threaded shaft 9. As a result, the cable tension is changed, which change becomes visible at the display 11 of the housing 8. As soon as the marking 12 and the centering line 13A coincide, the cable 3 has a desired tension. Should the cable length change because of thermal expansion, a retightening can take place by a precision adjustment of the knurled nut 10.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

We claim:

1. A quick action tensioning device for cable control switches, comprising:
    a holding element to which a cable is fastened in a clamping manner;
    a housing connected with the holding element;
    a first device and a second device are provided between the housing and the holding element for precisely adjusting a distance between the housing and the holding element; and
    wherein the holding element includes a plate, and the cable is clamped between the plate and a body of the holding element.

2. The quick-action tensioning device according to claim 1, wherein the first device is a threaded shaft and the second device is a nut.

3. The quick-action tensioning device according to claim 4, wherein the nut includes a knurled nut.

4. The quick-action tensioning device according to claim 1, wherein a device for detecting a tension of the cable is provided in the housing.

5. The quick-action tensioning device according to claim 1, wherein a display of the cable tension is provided on the housing.

6. The quick-action tensioning device according to claim 1, wherein the cable is deflected between the plate and the body.

* * * * *